Figure 12:
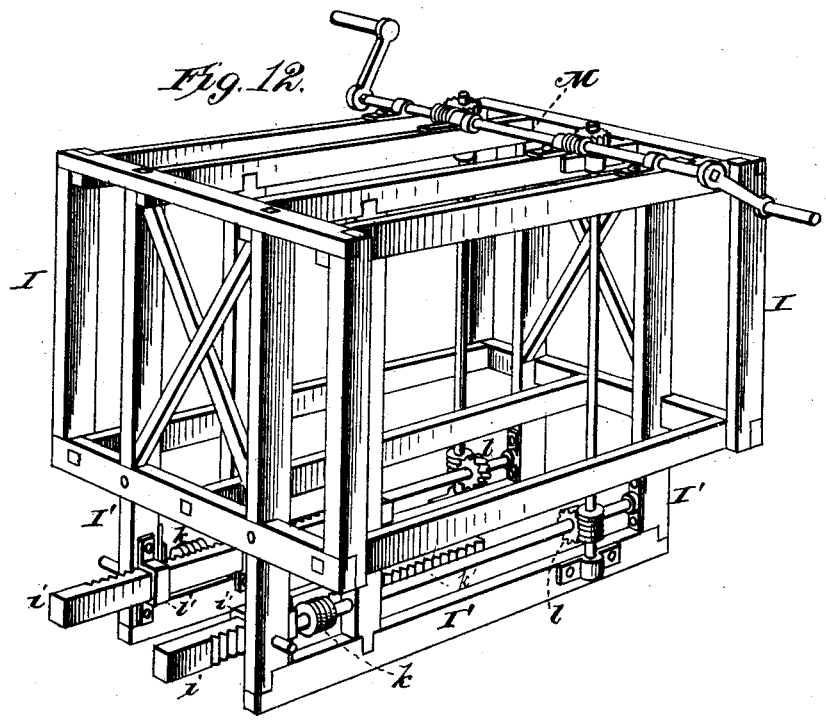

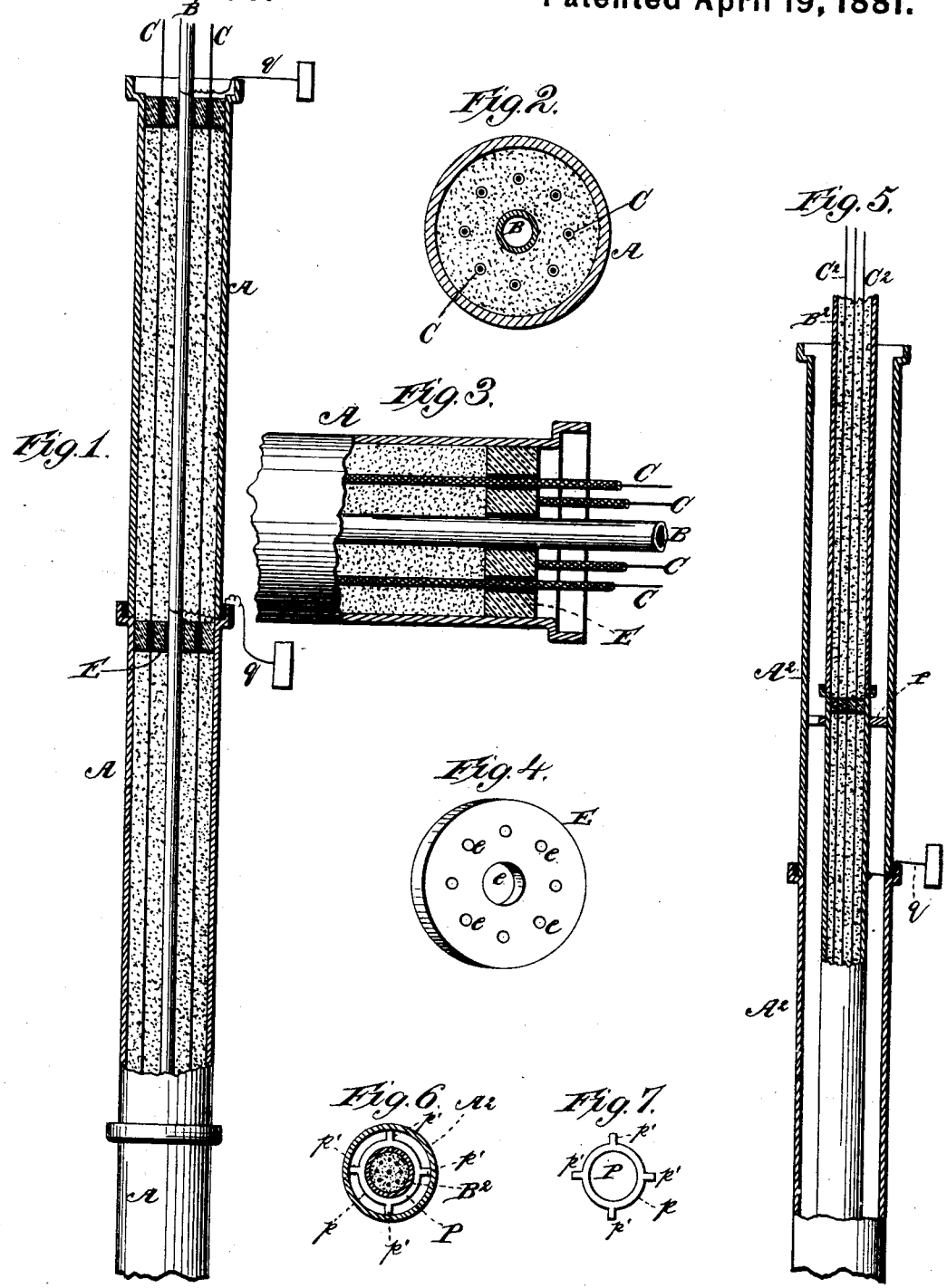

(No Model.) 4 Sheets—Sheet 2.
P. B. DELANY.
Insulating and Protecting Electrical Conductors.
No. 240,236. Patented April 19, 1881.
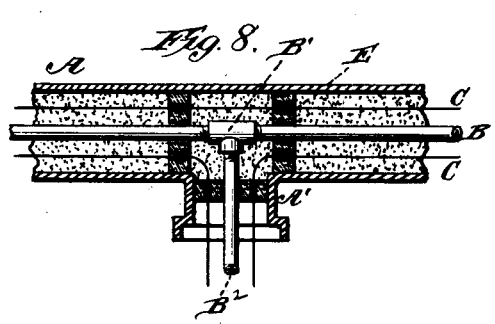
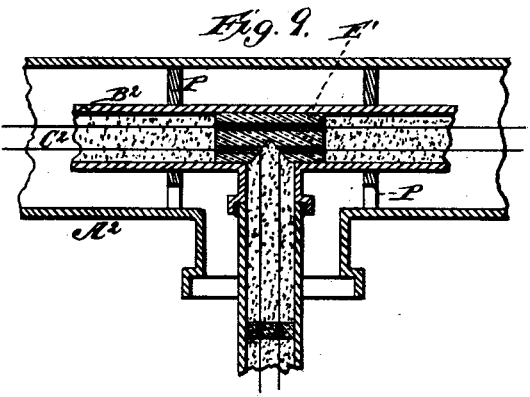
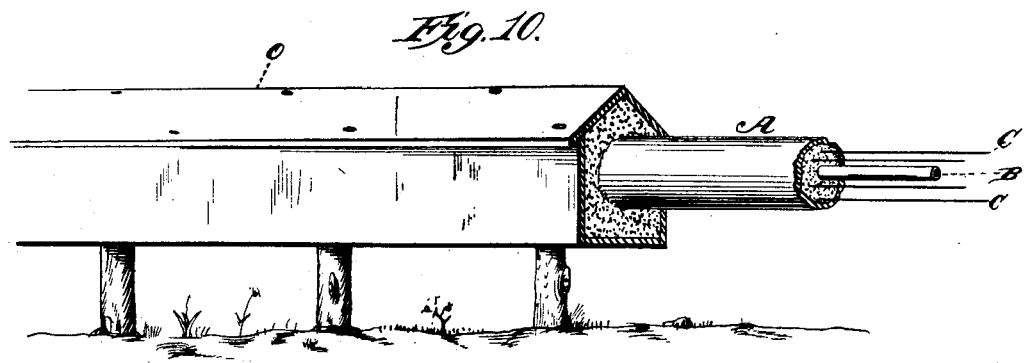
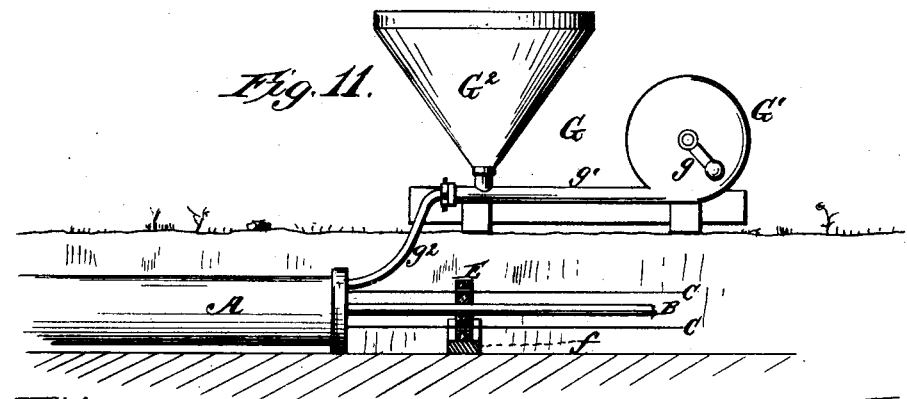
Witnesses.
Robert Everett
George M. Hayward
Inventor,
Patrick B. Delany, by
Fred M. Royce
his Attorney.

(No Model.) 4 Sheets—Sheet 3.

P. B. DELANY.
Insulating and Protecting Electrical Conductors.

No. 240,236. Patented April 19, 1881.

Witnesses.
Robert Everett
George M. Haymard

Inventor.
Patrick B. Delany
Fred N. Royce
his Attorney

N. PETERS, PHOTO-LITHOGRAPHER, WASHINGTON, D. C.

(No Model.) 4 Sheets—Sheet 4.
P. B. DELANY.
Insulating and Protecting Electrical Conductors.
No. 240,236. Patented April 19, 1881.
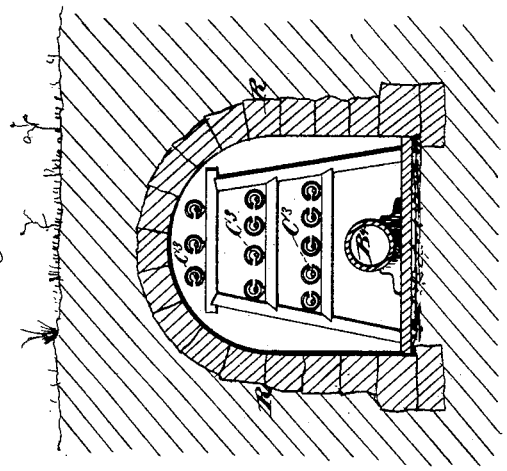
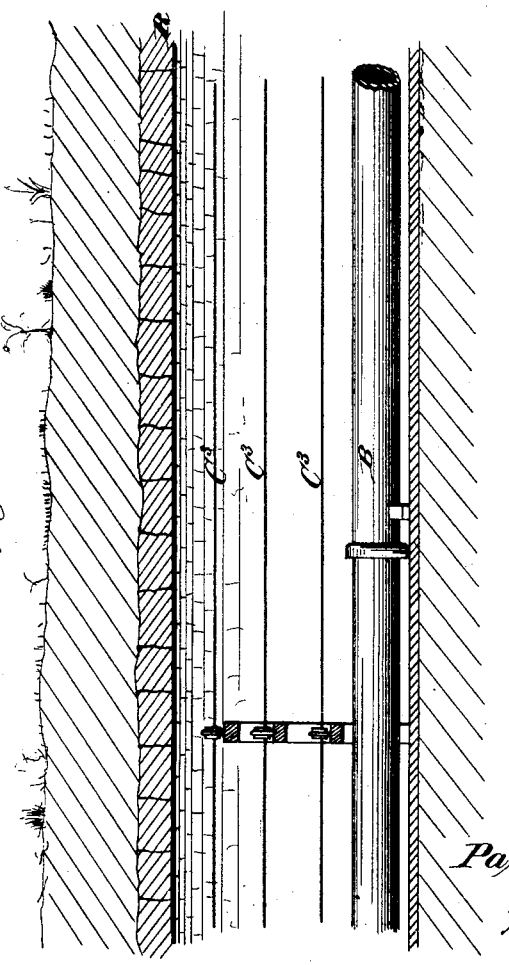
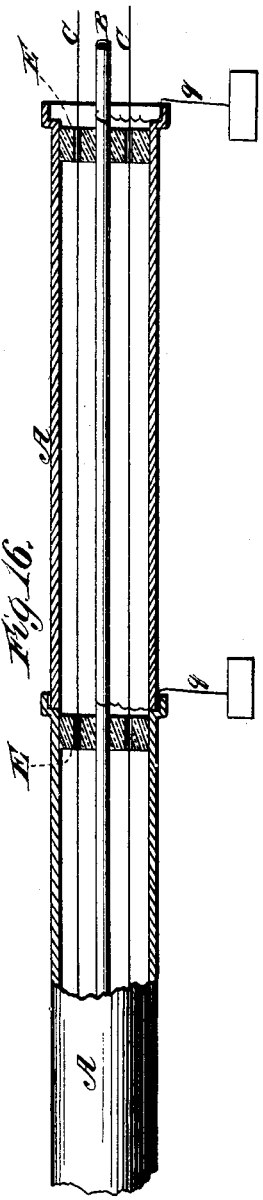
Witnesses.
Robert Everett
George M. Hayward
Inventor.
Patrick B. Delany
Fred W. Royce
his Atty.

UNITED STATES PATENT OFFICE.

PATRICK B. DELANY, OF NEW YORK, N. Y.

INSULATING AND PROTECTING ELECTRICAL CONDUCTORS.

SPECIFICATION forming part of Letters Patent No. 240,236, dated April 19, 1881.

Application filed February 2, 1881. (No model.)

*To all whom it may concern:*

Be it known that I, PATRICK B. DELANY, a citizen of the United States, residing at New York, in the county of New York and State of New York, have invented certain new and useful Improvements in Insulating and Protecting Electrical Conductors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to produce, for either underground or overground use, a telegraph-cable which will be practically unaffected by variations of atmospheric or earth temperature, and in which the conductors will be protected from the effects of moisture and electrical induction.

Many inventions have been made looking to the production of a cable of this character, but experience has proven them to be but partially successful. In some of these cables the conducting-wires have been inclosed in tubes and surrounded by a fusible resinous insulating material, which is melted and forced into the tubes around the wires. Such insulating material has been found to be quite easily affected by even slight changes of temperature, and the tubes are, in consequence, warped and often broken, and the wires brought in contact with each other or the tube, and thus rendered useless as conductors. Most of such insulating materials also undergo chemical decomposition in a short time, and permit or promote the condensation of moisture upon the wires. In other cables the wires depend for protection and insulation upon fibrous vegetable insulators, which soon decay, and in one the conductors are inclosed in a tube kept filled with oil, which has been found to soon decompose and deleteriously affect the wires.

In the endeavor, which I believe to be entirely successful, to overcome the objections to the old styles of cables, my invention consists, mainly, in protecting the electrical conductors from moisture by conducting heat, by means of a suitable medium, in sufficiently close proximity to said conductors to dissipate all moisture in their immediate vicinity and prevent its condensation upon them.

My invention also consists in a telegraph-cable composed of an outer and a separate inner tube, forming two chambers, in one of which are arranged the electrical conductors, properly supported and insulated, while the other chamber serves as a passage for a suitable heating medium, such as hot air, hot water, or steam, this second part of my invention being a practical application of the first part.

My invention further consists in a telegraph-cable composed of a protecting-tube, in which are stretched the conducting-wires, surrounded by dry pulverized talc. This substance is not liable to be affected by variations of atmospheric or earth temperature, and therefore the cable will not be warped, twisted, or ruptured by contractions and expansions of the insulating material. It is extremely unliable to chemical change, and, when properly packed, remains well in that condition, and is not liable to crumble or be injuriously affected by any thermic or hygrometric conditions which it is likely to encounter. Talc is plentiful and easily accessible, there being extensive mines or veins of it in various parts of the country. It is therefore cheap.

My invention also consists in a telegraphic cable composed of an outer and an inner tube, between which are arranged the electrical conductors, packed in a suitable insulating material, while the inner tube is left to serve as a passage for a heating medium. This heating medium, while serving the other purposes hereinbefore set forth, also, by its action upon the insulating material, causes said material to have some little degree of electrical conductivity, just about sufficient to relieve the wires of overstrain from electrical currents, and prevent them in a great degree from affecting one another by induction. Induction has been deemed by electricians to be caused by an electrical strain of the inducing body having no outlet or escape, and it is also known that even solid glass becomes in some degree a conductor when heated.

In the accompanying drawings, Figure 1 is a view, partly in section, of a portion of a telegraph-cable constructed according to my invention. Fig. 2 is a cross-section of the cable.

Figure 13:
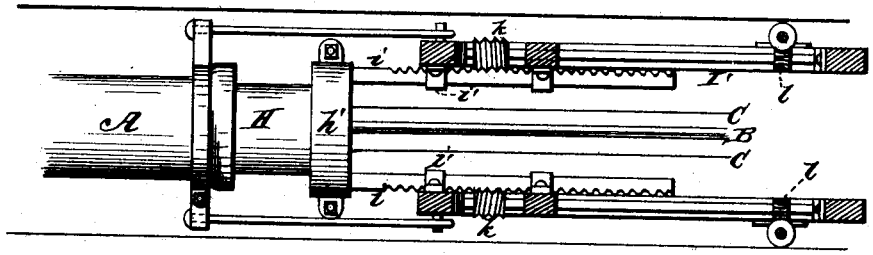
Figure 14:
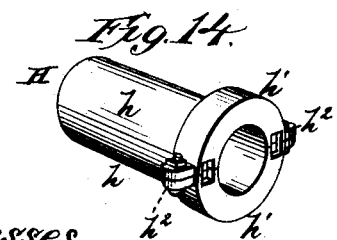
Figure 15:
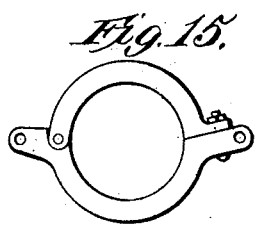

Fig. 3 is an enlarged view, mainly in section, of a portion of the cable. Fig. 4 is a view of a templet for supporting the wires and inner tube of a cable constructed as shown in the preceding figures. Fig. 5 is a view, mainly in section, and Fig. 6 a cross-sectional view, of a modified form of the cable. Fig. 7 is a view of an open frame or spider for supporting the inner tube of a cable constructed as shown in Fig. 5. Fig. 8 illustrates a mode of connecting a branch cable with the form of cable illustrated in Figs. 1, 2, and 3. Fig. 9 illustrates the junction of a branch with the form of cable shown in Fig. 5. Fig. 10 is a perspective view, illustrating a mode of laying an overground cable constructed according to my invention. Fig. 11 is a view of a portion of a cable in process of construction, and of an apparatus used for introducing the insulating material. Fig. 12 is a perspective view of an apparatus used in ramming the pulverized talc material in the tube. Fig. 13 is a plan view, partly in section, illustrating the mode of ramming the insulating material in the tube. Fig. 14 is a view of the follower. Fig. 15 is a view of the yoke for connecting the tube with the frame of the ramming-machine. Fig. 16 is a sectional view, illustrating a cable similar to that shown in Fig. 1, but with the packed talc omitted; Fig. 17, a partially-sectional view of the wires not surrounded by the packed talc, and a heat-conducting tube, arranged in a tunnel. Fig. 18 is a cross-section of the tunnel.

Referring to Fig. 1, the letter A indicates an outer tube, which may be made of any suitable material, preferably of cast-iron, and in short lengths, connected by leaded joints, like ordinary gas-mains.

B is the inner tube, which may be also made of any suitable material which is practically impervious to air and water, but for which, by preference, I use an iron pipe, in sections, connected by suitable couplings, an inner tube of, say, one inch diameter being placed in an outer tube of, say, six inches diameter. These proportions may, however, be varied as desired.

C designates the conducting-wires, which are stretched in the space between the inner and outer tubes.

D is the insulating material which surrounds the inner tube and the wires, and is tightly packed between the two tubes by apparatus, which will be hereinafter described, or by any other suitable means.

The letter E designates the templets which maintain the tubes and wires in their proper relative positions, each of said templets being a disk, of porcelain or other non-conductor of electricity, of a diameter to fit and move snugly within the outer tube, and provided with a central aperture, e, for the passage of the inner tube, and a surrounding series of apertures, e', for the passage of the wires.

The various elements of the cable are manufactured or prepared in the usual manner; but the cable as a whole, as composed of these elements, is made as it is laid or arranged for use, and in substantially the manner described as follows:

Supposing an underground cable is to be laid, a trench is dug of the desired depth—say two or three feet—and on the bottom of this trench are laid in order the lengths or sections of the outer tube, these sections being separated from each other by a suitable space for convenience in working—say, for instance, a suitable number of sections are laid to form a mile of the cable. I then pass through all these sections a somewhat greater length, preferably of the iron pipe, which is to form the inner tube. I then pass through the sections the predetermined number of wires which are to form the electrical conductors. Ample room should be left at the initial end of the trench for convenience in working—that is, about a rod should at first be left vacant from the point where the cable is to begin. The inner tube and wires having been passed through the outer tube-sections, I draw these wires and tube some distance beyond the initial section, and then string upon said wires and tube a sufficient number of the templets E for use in the length of cable to be presently constructed—that is, one templet for each outer tube-section, though more may be used if desired. The wires being passed through properly-coincident apertures of the templets, the initial section of the outer tube is then moved along in the trench to the place it is to finally occupy, and all save one of the templets which have been strung upon the wires and inner tube are forced through the initial section of the outer tube and moved along the wires in advance of said section, so as to be out of the way of subsequent operations. I then secure the wires and inner tube in any suitable manner, so that they cannot be drawn through the apertures of the first templet—that is, the one which has not been passed through the initial section of the outer tube—leaving a sufficient length of wires and inner tube projecting through said templet for convenience in making connections. The said templet is then placed so as to close the end of the initial outer tube section, and there secured by any suitable means—say, for instance, by having a suitable bar secured to its outer face, which will project radially beyond the tube-wall; or this first templet may have a rim to fit against the end edge of the tube.

I now have the parts referred to arranged as partially shown in Fig. 11, and one of the templets which has been passed through should be moved up toward the mouth of the initial outer tube-section, as shown in said figure, this templet being supported by a shoe, $f$, at a little distance from the mouth of the outer tube-section, to bring its apertures in line with those of the templet in the opposite end of said tube-section, in order that the wires and inner tube may be held straight. The initial outer tube-section is then ready to receive the insulating material which is to be packed within it and surround the wires and inner tube respectively. This insulating material, being coarsely powdered, is to be blown in by the apparatus G, (shown in Fig. 11,) in which figure G' is a case, in which is mounted a fan operated by a crank, $g$, and from this case leads an eduction-tube, $g'$, at an intermediate point of which is connected a hopper, $G^2$, while to the end of said eduction-tube is connected a hose, $g^2$. The end of this hose being introduced into the tube-section nearly the full length of said section, the powdered insulating material, having been previously heated to expel moisture, is placed in the hopper and the fan operated, when the said powdered material will be forced snugly into the tube, the hose being gradually withdrawn as the filling proceeds. When the tube-section has been properly filled—say, to within three or four inches, or as near as practicable to its mouth—the hose is entirely withdrawn, and the templet which had been placed upon the shoe $f$ is forced into the mouth of the section, and said templet and the insulating material are then rammed in by means of the apparatus shown in Figs. 12, 13, and 14, or any other suitable means.

Referring to the apparatus illustrated in these figures, the letter H designates a hollow follower composed of two longitudinal semi-cylindrical sections, $h\ h$, provided with heavy-head flanges $h'$ and ears $h^2$, which are held together by suitable bolts when the parts are together. This hollow follower is placed around the wires and inner tube in advance of the tube-section, and its smaller end introduced into the mouth of the section and against the margin of the templet which is in front of the insulating material. In this position the follower is ready to be operated upon by the ramming-machine shown in Fig. 12. This machine consists of a frame, I, adapted to sit upon the surface of the ground, and provided with downward-projecting portions I', adapted to extend down into the trench. On the inner sides of these downward-projecting portions are arranged the ramming-bars $i$, moving in suitable guides $i'$, and provided on their outer surfaces with teeth, which engage the worms $k$, mounted on shafts $k'$, these shafts having fixed upon them worm-wheels $l$, which engage with the worms $l'$ on vertical shafts $l^2$, these vertical shafts being provided with worm-wheels, which engage with worms on the motive shaft M, which is provided with suitable cranks. The machine is arranged, by blocking or otherwise, so that the outer ends of the bars $i$ will bear against opposite sides of the head of the follower H, as shown in Fig. 13, the follower-head being preferably provided with sockets to receive the ends of said bars. The yoke N (shown in Fig. 15) is placed around the end of the tube-section, behind its collar, as shown, and connected with the frame of the machine by the rods $n$, and the machine is then operated by turning the cranks of shaft M, the bars $i$ advancing and driving the follower H in until the insulating material is packed as tightly as desired. The ramming being completed, the apparatus and appliances used therefor are removed, an additional tube-section is moved up, its end placed in the collar of the rammed section, and the joint leaded in the ordinary manner, as shown in Fig. 1. It is then filled and rammed, as was the first section, and the operation is the same for all succeeding sections.

Any suitable apparatus may be used for filling and ramming the sections without departing from my invention.

The length of trench dug and number of tube-sections laid to operate upon at any particular time depends entirely upon convenience.

In order to guard against interruption of the insulation by accident, the inner tube may be surrounded by a sheath of mill-board or pasteboard if desired.

The form of cable the construction of which has now been described may be laid overground as well as underground—as, for instance, along the line of railways—and in such case may be conducted across streams, ravines, and marshes by the trestle-work which supports the track and bridges. In laying this style of cable overground I preferably arrange it in a housing, O, as shown in Fig. 10, this housing being supported on short posts $o$, the height of which may vary in accordance with the topography of the route, in order to keep the cable as nearly on a level as is found desirable. The housing O should have a proper transverse capacity to permit the cable to be surrounded by an insulating material similar to that within it, the cable being supported centrally within the housing by any suitable means preparatory to the insulating material being placed around it. Suitable cross-partitions might be placed at intervals in the housing, with apertures for the passage of the cable, the insulating material being filled in between said partitions and the roof of said housing, or one side of the roof afterward placed in position.

While it is probably preferable to protect the overground cable by the housing, substantially as described, it is not absolutely necessary, as the cable may be supported by suitable brackets or slings on posts, trestle-work, or bridges, and painted to protect the outer tube from the weather.

The cable, either overground or underground, being in readiness for use, a current of hot water, steam, or hot air is to be forced through the inner tube, and will, by the heat which it imparts, effectually dissipate all moisture, which is otherwise liable to collect by condensation upon the wires and tubes, said wires and tubes being always maintained in their relative positions and the wires properly insulated, owing to the non-susceptibility of the insulating material to chemical change or to be affected by variation of temperature.

The entire cable may have branches connected with it in any suitable manner—as, for instance, as shown in Fig. 8, where the letter B' indicates a T-joint inserted in the inner tube, and a branch tube, B², is connected with said joint and leads through a neck, A', projecting from the side of the outer tube. To this neck a branch outer tube may be connected and constructed in the same manner as described for the main cable. In order to properly support the main inner tube at the commencing of the construction of the branch cable, templets should be placed, as shown, in the main outer tube, near each side of the junction of the branch, and these templets, in conjunction with another, which is placed in the neck A', serve to support the branching wires where they bend to change direction. Ordinary T-joints may also be used for forming the junction of branches with the outer tube, and two branches may lead in opposite directions from the main cable if desired, the ordinary four-way joint being used in such cases.

In the modification illustrated in Fig. 5 I reverse the relative positions of the electrical conductors and the heating medium. In this modification the sections of the outer tubing are joined together in the same manner as shown in Fig. 1, but the inner tube, B², is relatively much larger than the inner tube shown in said Fig. 1, in order that it may have sufficient capacity to contain the properly-separated electrical conductors C². The inner tube, B², is composed of short lengths of either iron or earthenware tubing, having collars for forming joints in the ordinary manner, and should be arranged to break joints with the outer tube, so that in constructing the cable the end of the inner tube will project outward beyond the end of the last laid section of the outer tube. This is for convenience in filling in and ramming the insulating material in the inner tube, this filling and ramming being performed with obvious modifications of the apparatus heretofore described. The templets for the inside of tube B² are simply disks, of porcelain or other rigid insulating material, pierced with apertures for the passage of the wires. The tube B² is supported centrally within the outer tube, A², by means of open frames or spiders P, consisting of bands $p$, having lugs $p'$ projecting outward therefrom, and of such length as to permit said spiders or open frames to fit within the outer tube. A sufficient number of these spiders, and also of the templets, must be passed over the wires at the commencement of the construction, and in laying down the tube-sections for use one of the smaller sections should be placed in each large section, in order to have them conveniently near each other when required. The outer tube having an inner diameter of six inches, the inner tube may have an external diameter of about four or five inches, the intervening space forming the passage of the heating medium. This modification of the cable may be laid overground, as well as the form illustrated in Fig. 1, but more particularly requires to be protected by a housing and surrounding insulating material, to prevent loss of heat by radiation, as in this case the heating medium is next to the outer tube, while in the former case radiation is almost entirely prevented by the packed pulverized talc which surrounds the inner tube.

In Fig. 9 is illustrated the mode of making junction for a branch of cable constructed according to Fig. 5. T-joints are used in both pipes, and an elongated templet, E', with side passages for the branch wires, is preferred.

The wires used in both the modifications of the cable may be naked, but I prefer to have them provided with an insulating coating of cotton, kerite, or some other approved insulator before being embedded in the mineral in the tubes. I do not confine myself to any particular forms of joints or couplings, as it is obvious that the various forms in use may be used as well with my tubes as elsewhere.

By means of suitable joints or junction-pieces branches may be run to the surface from underground pipes for establishing test-boxes at proper points.

The inner tube, when metallic, in both forms of cable may be used as an electrical conductor for sending either reversed or constant currents, which will counteract the effect of induction between the wires, or it may be grounded at such distances as may be found desirable for the purpose of destroying induction.

In Fig. 1 the letter $q$ indicates wires connecting the inner and outer tubes, which is equivalent to grounding, of course, when the outer tube is in contact with the ground; but in an overground cable the said wires should pass through the outer tube and to the ground.

I wish it to be understood that I may use a cable composed simply of a tube containing the conductors packed in powdered talc, without the heating-tube, and without departing from my invention; or I may arrange the wires or conductors without the surrounding packed mineral in any suitable inclosure or passage-way, and arrange also, in or adjacent to said passage-way, a conducting passage or tube for a heating medium—as, for instance, the wires, without the surrounding packed mineral, may be properly supported through a tunnel or covered trench, or inclosed viaduct, through which is arranged a pipe or passage for conducting a heating medium. In Figs. 17 and 18 the letter R indicates the wall of the tunnel, C³ the conducting-wires, and B⁴ a tube or pipe for conducting hot air, hot water, or steam.

A cable may be constructed as shown in either Figs. 1 or 5, with the packed mineral omitted, in which case the wires, properly insulated, will be surrounded by hot air, in direct contact with them. This form is shown in Fig. 16.

I am aware that powdered glass, silicious stones, and asbestus have been used to pack tubular telegraph-cables, and I do not claim any of those substances. Powdered glass and stones are good conductors of heat, and would permit a radiation very disadvantageous to my heated cable, while asbestus will not remain in a packed condition except under continuous pressure.

What I claim is—

1. The method herein described of protecting electrical conductors from moisture, the same consisting in conducting heat by means of a suitable medium in proximity to said conductors, whereby moisture will be dissipated in the neighborhood of, and prevented from condensing upon, said conductors, substantially as described.

2. A telegraph-cable composed of a protecting-tube, in which are arranged the conducting-wires, closely surrounded by pulverized talc, which is packed within said tube and closely around said wires.

3. A telegraph-cable composed of an inner and a separate outer tube, forming two chambers, one of said chambers containing the conducting-wires packed in a suitable insulating material, and the other being left vacant to serve as a conductor for a heating medium, substantially as described.

4. A telegraph-cable composed of an outer and a separate inner tube, between which are arranged the conducting-wires packed in a suitable insulating material, while the inner tube is left to serve as a passage for a heating medium, substantially as described.

In testimony whereof I affix my signature in presence of two witnesses.

PATRICK B. DELANY.

Witnesses:
B. W. FERGUSON,
ED. SLATER.